United States Patent
Boon et al.

(10) Patent No.: US 8,779,225 B2
(45) Date of Patent: *Jul. 15, 2014

(54) CONVERSION OF A SOLID BIOMASS MATERIAL

(75) Inventors: Andries Quirin Maria Boon, HW Amsterdam (NL); Johan Willem Gosselink, HW Amsterdam (NL); John William Harris, HW Amsterdam (NL); Andries Hendrik Janssen, HW Amsterdam (NL); Sander Van Paasen, HW Amsterdam (NL); Colin John Schaverien, HW Amsterdam (NL); Nicolaas Wilhelmus Joseph Way, HW Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/453,880

(22) Filed: Apr. 23, 2012

(65) Prior Publication Data

US 2012/0291340 A1 Nov. 22, 2012

(30) Foreign Application Priority Data

Apr. 21, 2011 (EP) .................................... 11163411

(51) Int. Cl.
*C07C 1/00* (2006.01)
*B01J 8/00* (2006.01)

(52) U.S. Cl.
USPC ............. 585/240; 585/242; 44/605; 44/606; 422/139; 422/145; 422/146

(58) Field of Classification Search
USPC ............ 585/240, 242; 44/605, 606; 422/139, 422/145, 146; 208/161
See application file for complete search history.

(56) References Cited

U.S. PATENT DOCUMENTS

| | | | |
|---|---|---|---|
| 3,502,574 A | 3/1970 | Baillie | |
| 4,173,527 A * | 11/1979 | Heffley et al. | 208/153 |
| 4,331,533 A * | 5/1982 | Dean et al. | 208/113 |
| 4,438,147 A | 3/1984 | Hedrick et al. | |
| 4,666,586 A * | 5/1987 | Farnsworth | 208/161 |
| 4,737,346 A * | 4/1988 | Haddad et al. | 422/144 |
| 4,851,109 A | 7/1989 | Chen et al. | |
| 4,875,996 A * | 10/1989 | Hsieh et al. | 208/157 |
| 5,468,369 A * | 11/1995 | Muldowney | 208/113 |
| 6,652,815 B1 * | 11/2003 | Sattar | 422/145 |
| 2008/0035526 A1 | 2/2008 | Hedrick et al. | |

(Continued)

FOREIGN PATENT DOCUMENTS

| | | |
|---|---|---|
| EP | 321305 | 6/1989 |
| EP | 699225 | 4/1992 |

(Continued)

OTHER PUBLICATIONS

PCT 'Written Opinion' for Application No. PCT/EP2012/057415, Nov. 16, 2011.

(Continued)

*Primary Examiner* — Nina Bhat

(57) ABSTRACT

A process or a system for converting a solid biomass material is provided, comprising contacting the solid biomass material with a catalytic cracking catalyst at a temperature of more than 400° C. in a riser reactor to produce one or more cracked products. The riser reactor contains: a riser reactor pipe, which riser reactor pipe has a diameter that increases in a downstream direction; and a bottom section connected to the riser reactor pipe, which bottom section has a larger diameter than the riser reactor pipe.

18 Claims, 1 Drawing Sheet

(56) References Cited

U.S. PATENT DOCUMENTS

| | | | |
|---|---|---|---|
| 2009/0253948 A1 | 10/2009 | McCall et al. | |
| 2010/0105970 A1 | 4/2010 | Yanik et al. | |
| 2011/0154720 A1* | 6/2011 | Bartek et al. | 44/307 |

FOREIGN PATENT DOCUMENTS

| | | |
|---|---|---|
| EP | 705321 | 6/1994 |
| EP | 649896 | 4/1995 |
| EP | 994173 | 4/2000 |
| EP | 1892280 | 2/2008 |
| EP | 2053114 | 4/2009 |
| EP | 2107100 | 7/2009 |
| GB | 2371807 | 8/2002 |
| GB | 2386607 | 9/2003 |
| WO | 9206848 | 4/1992 |
| WO | 9600604 | 1/1996 |
| WO | 9718278 | 5/1997 |
| WO | 2006121212 | 11/2006 |
| WO | 2007090884 | 8/2007 |
| WO | 2010002792 | 1/2010 |
| WO | 2010062611 | 6/2010 |
| WO | 2010135734 | 11/2010 |

OTHER PUBLICATIONS

Zhang, Qi et al., "Review of Biomass Pyrolysis Oil Properties & Upgrading Research", Energy Conversion & Management, Elsevier, Science Publishers, Oxford, GB, vol. 48 (2007) pp. 87-92.

Lappas, A, et al. "Biomass Pyrolysis in a Circulating Fluid Bed Reactor for Production of Fuels & Chemicals", Chemical Process Engineering Research Institute & Chemical Engineering Aristotelian University of Thessaloniki, Greece, Fuel, vol. 81 (2002), pp. 2087-2095.

Sadeghbeigi, R. "Fluid Catalytic Cracking Handbook"—Design, Operation, & Troubleshooting of FCC Facilities, Gulf Publishing Co., Houston, TX (1995), pp. 219-223.

Schoenmakers, P.J., et al, "Comparison of Comprehensive Two-Dimensional Gas Chromatography & Gas Chromatography—Mass Spectrometry for the Characterization of Complex Hydrocarbon Mixtures", Journal of Chromatography A, vol. 892 (2000) pp. 29-46.

Wilson, J.W., "Fluid Catalytic Cracking Technology & Operations", PennWell Publishing Co. (1997), Chapter 3, FIGs 3-7.

Wilson, J.W., "Fluid Catalytic Cracking Technology & Operations", PennWell Publishing Co., Oklahoma, (1997), Chapter 3, pp. 101-112.

Wilson, J.W., "Fluid Catalytic Cracking Technology & Operations", PennWell Publishing Co., Oklahoma, (1997), Chapter 3, pp. 104-120 & Chapter 6, pp. 186-194.

Wilson, J.W., "Fluid Catalytic Cracking Technology & Operations", PennWell Publishing Co., Oklahoma, (1997), Chapter 8, pp. 14-18 & 223 to 235.

European Search Report dated Nov. 17, 2011 for Application No. EP11163411.9.

* cited by examiner

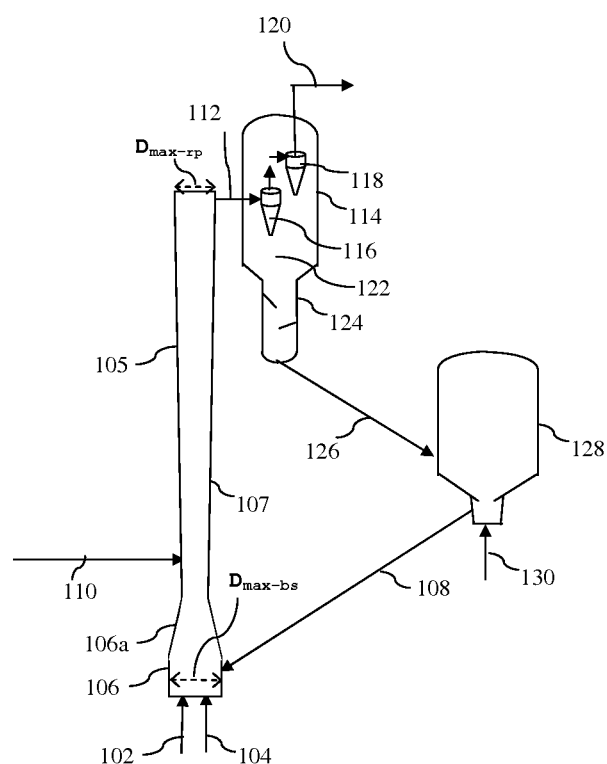

US 8,779,225 B2

CONVERSION OF A SOLID BIOMASS MATERIAL

The present application claims the benefit of European Patent Application No. 11163411.9, filed Apr. 21, 2011 the entire disclosure of which is hereby incorporated by reference.

FIELD OF THE INVENTION

The invention relates to a process for converting a solid biomass material and a process for producing a biofuel and/or biochemical.

BACKGROUND TO THE INVENTION

With the diminishing supply of crude mineral oil, use of renewable energy sources is becoming increasingly important for the production of liquid fuels. These fuels from renewable energy sources are often referred to as biofuels.

Biofuels derived from non-edible renewable energy sources, such as cellulosic materials, are preferred as these do not compete with food production. These biofuels are also referred to as second generation, renewable or advanced, biofuels. Most non-edible renewable energy sources, however, are solid materials that are cumbersome to convert into liquid fuels.

For example, the process described in WO 2010/062611 for converting solid biomass to hydrocarbons requires three catalytic conversion steps. First the solid biomass is contacted with a catalyst in a first riser operated at a temperature in the range of from about 50 to about 200° C. to produce a first biomass-catalyst mixture and a first product comprising hydrocarbons (referred to as pretreatment). Hereafter the first biomass-catalyst mixture is charged to a second riser operated at a temperature in the range of from about 200° to about 400° C. to thereby produce a second biomass-catalyst mixture and a second product comprising hydrocarbons (referred to as deoxygenating and cracking); and finally the second biomass-catalyst mixture is charged to a third riser operated at a temperature greater than about 450° C. to thereby produce a spent catalyst and a third product comprising hydrocarbons. The last step is referred to as conversion to produce the fuel or specialty chemical product. WO 2010/062611 mentions the possibility of preparing the biomass for co-processing in conventional petroleum refinery units. The process of WO 2010/062611, however, is cumbersome in that three steps are needed, each step requiring its own specific catalyst.

WO2010/135734 describes a method for co-processing a biomass feedstock and a refinery feedstock in a refinery unit comprising catalytically cracking the biomass feedstock and the refinery feedstock in a refinery unit comprising a fluidized reactor, wherein hydrogen is transferred from the refinery feedstock to carbon and oxygen of the biomass feedstock. In one of the embodiments WO2010/135734 the biomass feedstock comprises a plurality of solid biomass particles having an average size between 50 and 1000 microns. In passing, it is further mentioned that solid biomass particles can be pre-processed to increase brittleness, susceptibility to catalytic conversion (e.g. by roasting, toasting, and/or torrefaction) and/or susceptibility to mixing with a petrochemical feedstock.

In the article titled "Biomass pyrolysis in a circulating fluid bed reactor for production of fuels and chemicals" by A. A. Lappas et al, published in Fuel, vol. 81 (2002), pages 2087-2095, an approach for biomass flash pyrolysis in a circulating fluid bed (CFB) reactor is described. The CFB reactor comprised a vertical riser type reactor (7.08 mm ID). The riser height was 165 cm. An integrated screw feeder system was designed and constructed for effective biomass introduction into the unit. From the screw feeder the biomass was introduced at the bottom of the riser, using a specifically designed injection-mixing system. This system consisted of a large diameter bottom vessel connected through a conical section with the riser reactor. In all experiments lignocell HBS 150-500 supplied by Rettenmaier GmbH (particle size 200-400 micrometer) was used as biomass feedstock. In the conventional biomass pyrolysis tests silica sand was used as a heat carrier. Catalytic biomass pyrolysis was performed using a commercial equilibrium FCC catalyst supplied by a Greek refinery. The Biomass pyrolysis experiments were performed at riser temperatures in the range of 400-500° C. Each biomass pyrolysis run required 2 hour for the line out and the heating up of the unit and 3 hours of a steady state operation.

It would be an advancement in the art to improve the above processes further.

For example, it has now for the first time been recognized that due to residual moisture in a solid biomass feedstock, such solid biomass feedstock may cause additional gasses to be formed during catalytic cracking thereof. These additional gases may cause a solid biomass feedstock to expand more in a riser reactor than a conventional petroleum based feedstock. The additional gas formation may lead to an increased gas velocity and/or an increased pressure. An increased gas velocity may in turn lead to insufficient conversion of the solid biomass feedstock and/or insufficient robustness of the process. Higher pressures may lead to increased safety risks.

In addition unconverted solid biomass particles may cause erosion and/or abrasion of the hardware. Further unconverted solid biomass material particles may increase the fouling in a reactor. This in turn may effect the robustness and reliability of the process.

Hence, in order to scale up the catalytic cracking of the solid biomass feedstock to a commercial scale, the process may require improvements to meet nowadays conversion, robustness, maintenance and/or safety requirements.

SUMMARY OF THE INVENTION

Such an improvement has been achieved with the process or system according to the invention. By feeding a solid biomass material via a bottom section to a riser reactor which includes a riser reactor pipe and a bottom section, which bottom section has a larger diameter than the riser reactor pipe and which riser reactor pipe has a diameter that increases in a downstream direction, more efficient conversion of a solid biomass material can be achieved.

Accordingly an embodiment provides a process or system for converting a solid biomass material, comprising contacting the solid biomass material with a catalytic cracking catalyst at a temperature of more than 400° C. in a riser reactor to produce at least one cracked product, wherein the riser reactor comprises:

a riser reactor pipe, which riser reactor pipe has a diameter that increases in a downstream direction; and a bottom section connected to the rise reactor pipe at its upstream end, which bottom section has a larger diameter than the riser reactor pipe;

and wherein the solid biomass material is supplied to the riser reactor in the bottom section.

In a further embodiment provides a process or system for converting a solid biomass material, comprising contacting the solid biomass material with a catalytic cracking catalyst at a temperature of more than 400° C. in a riser reactor to produce one or more cracked products, wherein the riser reactor comprises:

a riser reactor pipe, which riser reactor pipe has a diameter that increases in a downstream direction; and a bottom section connected to the rise reactor pipe, which bottom section has a larger diameter than the riser reactor pipe;

wherein the solid biomass material is supplied to the riser reactor in the bottom section; and wherein further a fluid hydrocarbon feed is contacted with the catalytic cracking catalyst in the riser reactor.

BRIEF DESCRIPTION OF THE DRAWINGS

FIG. 1 shows a schematic diagram of an embodiment of the process according to the invention.

DETAILED DESCRIPTION OF THE INVENTION

The process according to the invention may advantageously allow for a longer residence time of the solid biomass material in the riser reactor. In addition the solid biomass material may take advantage of a higher temperature and higher catalyst to feed weight ratios at the bottom of a riser reactor. This in turn may lead to an increased conversion of the solid biomass material.

In one embodiment, a process or system for converting a solid biomass material is provided, comprising contacting the solid biomass material with a catalytic cracking catalyst at a temperature of more than 400° C. in a riser reactor to produce one or more at least one cracked products, wherein the riser reactor comprises:

a riser reactor pipe, which riser reactor pipe has a diameter that increases in a downstream direction; and a bottom section connected via its truncated outlet to the bottom of the riser reactor pipe in an upstream direction, which bottom section has a larger diameter than the riser reactor pipe; and wherein the solid biomass material is supplied to the riser reactor in the bottom section.

The use of a riser reactor pipe that has a diameter that increases in a downstream direction may further allow for a safe expansion of the feedstock in the riser reactor. Even though the residual moisture in the solid biomass material may cause extra gas formation in the riser reactor pipe, the gas velocity and pressure in the riser reactor may still remain unchanged. This is especially advantageous when the solid biomass material is co-processed with a, preferably conventional, fluid hydrocarbon feed, as the process according to the invention may further allow the gas velocity, pressure and residence time of such a fluid hydrocarbon co-feed to remain unchanged.

In the process the solid biomass material may be converted into an intermediate oil product which intermediate oil product in turn can be cracked into at least one cracked product.

By increasing the conversion of the solid biomass material, the amount of unconverted solid biomass material particles may be decreased. This in turn may lead to a decrease in fouling of the reactor and may improve the robustness and reliability of the process.

The process may be easily implemented in existing refineries.

The cracked product produced by the process can be used as an intermediate to prepare a biofuel and/or biochemical component. Such a process can be simple and may require a minimum of processing steps to convert a solid biomass material to a biofuel component and/or biochemical component. Such biofuel component may be fully fungible.

The biofuel and/or biochemical component(s) may be further converted to and/or blended with one or more further components into biofuels and/or biochemicals.

The process may therefore also provide a more direct route via conversion of solid biomass material to second generation, or advanced, biofuels and/or biochemicals.

By a solid biomass material is herein understood a solid material obtained from a renewable source. By a renewable source is herein understood a composition of matter of biological origin as opposed to a composition of matter obtained or derived from petroleum, natural gas or coal. Without wishing to be bound by any kind of theory it is believed that such material obtained from a renewable source may contain carbon-14 isotope in an abundance of about 0.0000000001%, based on total moles of carbon.

Preferably the renewable source is a composition of matter of cellulosic or lignocellulosic origin. Any solid biomass material may be used in the process of the invention. In a preferred embodiment the solid biomass material is not a material used for food production. Examples of preferred solid biomass materials include aquatic plants and algae, agricultural waste and/or forestry waste and/or paper waste and/or plant material obtained from domestic waste.

Preferably the solid biomass material contains cellulose and/or lignocellulose. Examples of suitable cellulose and/or lignocellulose-containing materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the solid biomass material is selected from the group consisting of wood, sawdust, straw, grass, bagasse, corn stover and/or mixtures thereof. When the solid biomass material is wood, both hard as well as soft wood may be used.

The solid biomass material may have undergone drying, torrefaction, steam explosion, particle size reduction, densification and/or pelletization before being contacted with the catalyst, to allow for improved process operability and economics.

Preferably the solid biomass material is a torrefied solid biomass material. In a preferred embodiment the process according to the invention comprises a step of torrefying the solid biomass material at a temperature of more than 200° C. to produce a torrefied solid biomass material that is subsequently contacted with the catalytic cracking catalyst. The words torrefying and torrefaction are used interchangeable herein.

By torrefying or torrefaction is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the solid biomass material is preferably carried out at a temperature of more than 200° C., more preferably at a temperature equal to or more than 210° C., still more preferably at a temperature equal to or more than 220° C., yet more preferably at a temperature equal to or more than 230°

C. In addition torrefying of the solid biomass material is preferably carried out at a temperature less than 350° C., more preferably at a temperature equal to or less than 330° C., still more preferably at a temperature equal to or less than 310° C., yet more preferably at a temperature equal to or less than 300° C.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar absolute, corresponding to about 0.1 MegaPascal).

The torrefying step may be carried out batchwise or continuously.

The torrefied solid biomass material has a higher energy density, a higher mass density and greater flowability, making it easier to transport, pelletize and/or store. Being more brittle, it can be easier reduced into smaller particles.

Preferably the torrefied solid biomass material has an oxygen content in the range from equal to or more than 10 wt %, more preferably equal to or more than 20 wt % and most preferably equal to or more than 30 wt % oxygen, to equal to or less than 60 wt %, more preferably equal to or less than 50 wt %, based on total weight of dry matter (i.e. essentially water-free matter).

In a further preferred embodiment, any torrefying or torrefaction step further comprises drying the solid biomass material before such solid biomass material is torrefied. In such a drying step, the solid biomass material is preferably dried until the solid biomass material has a moisture content in the range of equal to or more than 0.1 wt % to equal to or less than 25 wt %, more preferably in the range of equal to or more than 5 wt % to equal to or less than 20 wt %, and most preferably in the range of equal to or more than 5 wt % to equal to or less than 15 wt %. For practical purposes moisture content can be determined via ASTM E1756-01 Standard Test method for Determination of Total solids in Biomass. In this method the loss of weight during drying is a measure for the original moisture content.

Preferably the solid biomass material is a micronized solid biomass material. By a micronized solid biomass material is herein understood a solid biomass material that has a particle size distribution with a mean particle size in the range from equal to or more than 5 micrometer to equal to or less than 5000 micrometer, as measured with a laser scattering particle size distribution analyzer. In a preferred embodiment the process according to the invention comprises a step of reducing the particle size of the solid biomass material, optionally before or after such solid biomass material is torrefied. Such a particle size reduction step may for example be especially advantageous when the solid biomass material comprises wood or torrefied wood. The particle size of the, optionally torrefied, solid biomass material can be reduced in any manner known to the skilled person to be suitable for this purpose. Suitable methods for particle size reduction include crushing, grinding and/or milling. The particle size reduction may preferably be achieved by means of a ball mill, hammer mill, (knife) shredder, chipper, knife grid, or cutter.

Preferably the solid biomass material has a particle size distribution where the mean particle size lies in the range from equal to or more than 5 micrometer (micron), more preferably equal to or more than 10 micrometer, even more preferably equal to or more than 20 micrometer, and most preferably equal to or more than 100 micrometer to equal to or less than 5000 micrometer, more preferably equal to or less than 1000 micrometer and most preferably equal to or less than 500 micrometer.

Most preferably the solid biomass material has a particle size distribution where the mean particle size is equal to or more than 100 micrometer to avoid blocking of pipelines and/or nozzles. Most preferably the solid biomass material has a particle size distribution where the mean particle size is equal to or less than 3000 micrometer to allow easy injection into the riser reactor.

For practical purposes the particle size distribution and mean particle size of the solid biomass material can be determined with a Laser Scattering Particle Size Distribution Analyzer, preferably a Horiba LA950, according to the ISO 13320 method titled "Particle size analysis—Laser diffraction methods".

Hence, preferably the process of the invention comprises a step of reducing the particle size of the solid biomass material, optionally before and/or after torrefaction, to generate a particle size distribution having a mean particle size in the range from equal to or more than 5, more preferably equal to or more than 10 micron, and most preferably equal to or more than 20 micron, to equal to or less than 5000 micron, more preferably equal to or less than 1000 micrometer and most preferably equal to or less than 500 micrometer to produce a micronized, optionally torrefied, solid biomass material.

In an optional embodiment the particle size reduction of the, optionally torrefied, solid biomass material is carried out whilst having the solid biomass material suspended in a hydro-carbon-containing liquid and/or water, to improve processibility and/or avoid dusting.

In one embodiment the fluid hydrocarbon co-feed as described herein below is used as hydrocarbon-containing liquid.

In a preferred embodiment the, optionally micronized and optionally torrefied, solid biomass material is dried before being supplied to the riser reactor. Hence, if the solid biomass material is torrefied, it may be dried before and/or after torrefaction. If dried before use as a feed to the riser reactor, the solid biomass material is preferably dried at a temperature in the range from equal to or more than 50° C. to equal to or less than 200° C., more preferably in the range from equal to or more than 80° C. to equal to or less than 150° C. The, optionally micronized and/or torrefied, solid biomass material is preferably dried for a period in the range from equal to or more than 30 minutes to equal to or less than 2 days, more preferably for a period in the range from equal to or more than 2 hours to equal to or less than 24 hours.

In addition to the, optionally micronized and/or optionally torrefied, solid biomass material preferably also a fluid hydrocarbon feed (herein also referred to as fluid hydrocarbon co-feed) is contacted with the catalytic cracking catalyst in the riser reactor.

In one preferred embodiment a fluid hydrocarbon feed is supplied to the riser reactor at a location downstream of the location where the solid biomass material is supplied to the riser reactor. This advantageously allows for a longer residence time for the solid biomass material. In addition it allows the solid biomass material to take advantage of the higher temperature and higher catalyst to feed weight ratios more upstream in the riser reactor, for example before the solid biomass is quenched with a fluid hydrocarbon feed. When a fluid hydrocarbon feed is supplied downstream, the solid biomass material may already be partly or wholly converted into oil and/or cracked products at the location where the fluid hydrocarbon feed is supplied to the riser reactor. In a preferred embodiment in the range from 1 wt % to 100 wt %, more preferably 5 wt % to 100 wt % of the solid biomass material is converted into an intermediate oil product and/or cracked products at such a location.

In another preferred embodiment the solid biomass material is supplied to the riser reactor at a location downstream of the location where the fluid hydrocarbon feed is supplied to the riser reactor. Without wishing to be bound by any kind of theory it is believed that by allowing the fluid hydrocarbon feed to contact the catalytic cracking catalyst first, hydrogen may be generated, as is typical of FCC operation. The availability of this hydrogen may assist in the reduction of coke formation when the solid biomass material is contacted with the catalytic cracking catalyst more downstream in the riser reactor.

In another embodiment a suspension of solid biomass material suspended in a fluid hydrocarbon feed is supplied to a riser reactor. This allows for a good processibility of the solid biomass material.

In a still further embodiment, a suspension of solid biomass material suspended in a first fluid hydrocarbon feed is supplied to the riser reactor at a first location and a second fluid hydrocarbon feed is supplied to the riser reactor at a second location downstream of the first location. Preferences for the first and second fluid hydrocarbon feed are as described herein below for the fluid hydrocarbon feed.

By a hydrocarbon feed is herein understood a feed that contains one or more hydrocarbon compounds. By a hydrocarbon compound is herein understood a compound that contains both hydrogen and carbon and preferably consists of hydrogen and carbon. By a fluid hydrocarbon feed is herein understood a hydrocarbon feed that is not in a solid state. More specifically a fluid hydrocarbon feed is herein understood to be a hydrocarbon feed that is not in a solid state when introduced to the riser reactor.

The fluid hydrocarbon co-feed is preferably a liquid hydrocarbon co-feed, a gaseous hydrocarbon co-feed, or a mixture thereof. The fluid hydrocarbon co-feed can be fed to a catalytic cracking reactor in an essentially liquid state, in an essentially gaseous state or in a partially liquid-partially gaseous state. When entering the catalytic cracking reactor in an essentially or partially liquid state, the fluid hydrocarbon co-feed preferably vaporizes upon entry and preferably is contacted in the gaseous state with the catalytic cracking catalyst and/or the solid biomass material. For fluid hydrocarbon feeds that are highly viscous, it may be advantageous to preheat such feeds before entering the riser reactor. For example, fluid hydrocarbon feeds such as a long residue, a vacuum gas oil and/or mixtures thereof may be preheated to a temperature equal to or above 250° C.

The fluid hydrocarbon feed can be any non-solid hydrocarbon feed known to the skilled person to be suitable as a feed for a catalytic cracking unit. The fluid hydrocarbon feed can for example be obtained from a conventional crude oil (also sometimes referred to as a petroleum oil or mineral oil), an unconventional crude oil (that is, oil produced or extracted using techniques other than the traditional oil well method) or a renewable oil (that is, oil derived from a renewable source, such as pyrolysis oil, vegetable oil, liquefied biomass and/or any mixture thereof), a Fisher Tropsch oil (sometimes also referred to as a synthetic oil) and/or a mixture of any of these.

In one embodiment the fluid hydrocarbon feed is derived from a, preferably conventional, crude oil. Examples of conventional crude oils include West Texas Intermediate crude oil, Brent crude oil, Dubai-Oman crude oil, Arabian Light crude oil, Midway Sunset crude oil or Tapis crude oil.

More preferably the fluid hydrocarbon feed comprises a fraction of a, preferably conventional, crude oil or renewable oil. Preferred fluid hydrocarbon feeds include straight run (atmospheric) gas oils, flashed distillate, vacuum gas oils (VGO), coker gas oils, diesel, gasoline, kerosene, naphtha, liquefied petroleum gases, atmospheric residue ("long residue") and vacuum residue ("short residue") and/or mixtures thereof. Most preferably the fluid hydrocarbon feed comprises a long residue and/or a vacuum gas oil.

In one embodiment the fluid hydrocarbon feed preferably has a 5 wt % boiling point at a pressure of 1 bar absolute (corresponding to 0.1 MegaPascal), as measured by means of distillation as based on ASTM D86 titled "Standard Test Method for Distillation of Petroleum Products at Atmospheric Pressure", respectively as measured by ASTM D1160 titled "Standard Test Method for Distillation of Petroleum Products at Reduced Pressure", of equal to or more than 100° C., more preferably equal to or more than 150° C. An example of such a fluid hydrocarbon feed is vacuum gas oil.

In a second embodiment the fluid hydrocarbon feed preferably has a 5 wt % boiling point at a pressure of 1 bar absolute (0.1 MegaPascal), as measured by means of distillation based on ASTM D86 titled "Standard Test Method for Distillation of Petroleum Products at Atmospheric Pressure", respectively as measured by ASTM D1160 titled "Standard Test Method for Distillation of Petroleum Products at Reduced Pressure", of equal to or more than 200° C., more preferably equal to or more than 220° C., most preferably equal to or more than 240° C. An example of such a fluid hydrocarbon feed is long residue.

In a further preferred embodiment equal to or more than 70 wt %, preferably equal to or more than 80 wt %, more preferably equal to or more than 90 wt % and still more preferably equal to or more than 95 wt % of the fluid hydrocarbon feed boils in the range from equal to or more than 150° C. to equal to or less than 600° C. at a pressure of 1 bar absolute (0.1 MegaPascal), as measured by means of a distillation by ASTM D86 titled "Standard Test Method for Distillation of Petroleum Products at Atmospheric Pressure", respectively as measured by ASTM D1160 titled "Standard Test Method for Distillation of Petroleum Products at Reduced Pressure".

The composition of the fluid hydrocarbon feed may vary widely.

Preferably the fluid hydrocarbon feed comprises in the range from equal to or more than 50 wt %, more preferably from equal to or more than 75 wt %, and most preferably from equal to or more than 90 wt % to equal to or less than 100 wt % of compounds consisting only of carbon and hydrogen, based on the total weight of the fluid hydrocarbon feed.

The fluid hydrocarbon feed may for example contain paraffins (including naphthenes), olefins and aromatics.

Preferably the fluid hydrocarbon feed comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total fluid hydrocarbon feed. By paraffins all of normal-, cyclo- and branched-paraffins are understood.

In another embodiment the fluid hydrocarbon feed comprises or consists of a paraffinic fluid hydrocarbon feed. By a paraffinic fluid hydrocarbon feed is herein understood a fluid hydrocarbon feed comprising in the range from at least 50 wt % of paraffins, preferably at least 70 wt % of paraffins, and most preferably at least 90 wt % paraffins, up to and including 100 wt % paraffins, based on the total weight of the fluid hydrocarbon feed.

For practical purposes the paraffin content of all fluid hydrocarbon feeds having an initial boiling point of at least 260° C. can be measured by means of ASTM method D2007-03 titled "Standard test method for characteristic groups in rubber extender and processing oils and other petroleum-derived oils by clay-gel absorption chromatographic method", wherein the amount of saturates will be representative for the paraffin content. For all other fluid hydrocarbon feeds the paraffin content of the fluid hydrocarbon feed can be measured by means of comprehensive multi-dimensional gas chromatography (GCxGC), as described in P. J. Schoenmakers, J. L. M. M. Oomen, J. Blomberg, W. Genuit, G. van Velzen, J. Chromatogr. A, 892 (2000) p. 29 and further.

Examples of paraffinic fluid hydrocarbon feeds include so-called Fischer-Tropsch derived hydrocarbon streams such as described in WO2007/090884 and herein incorporated by reference, or a hydrogen rich feed like hydrotreater product or hydrowax. By Hydrowax is understood the bottoms fraction of a hydrocracker. Examples of hydrocracking processes which may yield a bottoms fraction that can be used as fluid hydrocarbon feed, are described in EP-A-699225, EP-A-649896, WO-A-97/18278, EP-A-705321, EP-A-994173 and U.S. Pat. No. 4,851,109 and herein incorporated by reference.

By "Fischer-Tropsch derived hydrocarbon stream" is meant that the hydrocarbon stream is a product from a Fischer-Tropsch hydrocarbon synthesis process or derived from such product by a hydroprocessing step, i.e. hydrocracking, hydro-isomerisation and/or hydrogenation.

The Fischer-Tropsch derived hydrocarbon stream may suitably be a so-called syncrude as described in for example GB-A-2386607, GB-A-2371807 or EP-A-0321305. Other suitable Fischer-Tropsch hydrocarbon streams may be hydrocarbon fractions boiling in the naphtha, kerosene, gas oil, or wax range, as obtained from the Fischer-Tropsch hydrocarbon synthesis process, optionally followed by a hydroprocessing step.

The weight ratio of the solid biomass material to any fluid hydrocarbon feed may vary widely. For ease of co-processing the weight ratio of fluid hydrocarbon feed to solid biomass material is preferably equal to or more than 50 to 50 (5:5), more preferably equal to or more than 70 to 30 (7:3), still more preferably equal to or more than 80 to 20 (8:2), even still more preferably equal to or more than 90 to 10 (9:1). For practical purposes the weight ratio of fluid hydrocarbon feed to solid biomass material is preferably equal to or less than 99.9 to 0.1 (99.9:0.1), more preferably equal to or less than 95 to 5 (95:5). The fluid hydrocarbon feed and the solid biomass material are preferably being fed to the riser reactor in a weight ratio within the above ranges.

The amount of solid biomass material, based on the total weight of solid biomass material and any fluid hydrocarbon feed supplied to the riser reactor, is preferably equal to or less than 30 wt %, more preferably equal to or less than 20 wt %, most preferably equal to or less than 10 wt % and even more preferably equal to or less than 5 wt %. For practical purposes the amount of solid biomass material present, based on the total weight of solid biomass material and fluid hydrocarbon feed supplied to the riser reactor, is preferably equal to or more than 0.1 wt %, more preferably equal to or more than 1 wt %.

In a preferred embodiment the fluid hydrocarbon feed comprises equal to or more than 8 wt % elemental hydrogen (i.e. hydrogen atoms), more preferably equal to or more than 12 wt % elemental hydrogen, based on the total fluid hydrocarbon feed on a dry basis (i.e. water-free basis). A high content of elemental hydrogen, such as a content of equal to or more than 8 wt %, allows the hydrocarbon feed to act as a cheap hydrogen donor in the catalytic cracking process. A particularly preferred fluid hydrocarbon feed having an elemental hydrogen content of equal to or more than 8 wt % is Fischer-Tropsch derived waxy raffinate. Such Fischer-Tropsch derived waxy raffinate may for example comprise about 85 wt % of elemental carbon and 15 wt % of elemental hydrogen.

Without wishing to be bound by any kind of theory it is further believed that a higher weight ratio of fluid hydrocarbon feed to solid biomass material enables more upgrading of the solid biomass material by hydrogen transfer reactions.

The solid biomass material is contacted with the catalytic cracking catalyst in a riser reactor. By a riser reactor is herein understood an elongated, preferably essentially tube-shaped, reactor suitable for carrying out catalytic cracking reactions. Suitably a fluidized catalytic cracking catalyst flows in the riser reactor from the upstream end to the downstream end of the reactor. The elongated, preferably tube-shaped, reactor is preferably oriented in an essentially vertical manner. Preferably a fluidized catalytic cracking catalyst flows from the bottom of the riser reactor upwards to the top of the riser reactor.

Preferably the riser reactor is part of a catalytic cracking unit (i.e. as a catalytic cracking reactor), more preferably a fluidized catalytic cracking (FCC) unit.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference.

For example, the riser reactor may be a so-called internal riser reactor or a so-called external riser reactor as described therein.

Preferably the internal riser reactor is an essentially vertical reactor, and preferably an essentially tube-shaped essentially vertical reactor, that may have an essentially vertical upstream end located outside a vessel and an essentially vertical downstream end located inside the vessel. The vessel is suitably a reaction vessel suitable for catalytic cracking reactions and/or a vessel that comprises one or more cyclone separators and/or swirl separators. The downstream end of the internal riser reactor that is located inside the vessel preferably comprises equal to or more than 30%, more preferably equal to or more than 40%, still more preferably equal to or more than 50% and most preferably equal to or more than 70% of the total length of the riser reactor. The internal riser reactor is especially advantageous, because in the riser reactor the solid biomass material may be converted into an intermediate oil product. The intermediate oil product may be more prone to polymerization than conventional oils due to oxygen-containing hydrocarbons and/or olefins that may be present in the intermediate oil product. In addition the intermediate oil product may be more corrosive than conventional oils due to oxygen-containing hydrocarbons that may be present. The use of an internal riser reactor allows one to reduce the risk of plugging due to polymerization and/or to reduce the risk of corrosion, thereby increasing safety and hardware integrity.

By an external riser reactor is herein preferably understood a riser reactor that is located outside a vessel. The external riser reactor can suitably be connected via a so-called cross-over to a vessel. Preferably the external riser reactor comprises a, preferably essentially vertical, riser reactor pipe. Such a riser reactor pipe is located outside a vessel. The riser reactor pipe may suitably be connected via a, preferably essentially horizontal, downstream crossover pipe to a vessel. The downstream crossover pipe preferably has a direction essentially transverse to the direction of the riser reactor pipe. The vessel may suitably be a reaction vessel suitable for catalytic cracking reactions and/or a vessel that comprises one or more cyclone separators and/or swirl separators. Suitably the crossover pipe may also connect directly to a cyclone and/or swirl separator.

When an external riser reactor is used, it may be advantageous to use an external riser reactor with a curve or low velocity zone at its termination as for example illustrated in the Handbook titled "Fluid Catalytic Cracking technology and operations", by Joseph W. Wilson, published by PennWell Publishing Company (1997), chapter 3, FIG. 3-7, herein incorporated by reference.

By a low velocity zone is herein preferably understood a zone or an area within the external riser reactor where the velocity of the, preferably fluidized, catalytic cracking catalyst shows a minimum. The low velocity zone may for example comprise an accumulation space located at the most downstream end of the upstream riser reactor pipe as described above, extending such riser reactor pipe beyond the connection with the crossover pipe. An example of a low velocity zone is the so-called "Blind Tee".

It has been advantageously found that a part of the catalytic cracking catalyst may deposit in the curve or low velocity zone, thereby forming a protective layer against corrosion and/or erosion by the catalytic cracking catalyst and/or any residual solid particles and/or any oxygen-containing hydrocarbons as explained above.

It is also possible for the internal riser reactor or the external riser reactor to be part of a so-called U-bend. In such a case one leg of the U-bend may be used as standpipe and the other leg of the U-bend may be used as riser reactor. For example, regenerated catalyst may flow from a catalyst regenerator into an inlet at the upstream top of the U-bend downwardly through the bend and subsequently upwardly to the outlet at the downstream top of the U-bend.

In the process according to the invention the riser reactor comprises a riser reactor pipe and a bottom section, which bottom section has a larger diameter than the riser reactor pipe, and the solid biomass material is supplied to the riser reactor in the bottom section.

Preferably the riser reactor pipe is fluidly connected to the bottom section. More preferably the riser reactor pipe is fluidly connected at its upstream end to the bottom section. By fluidly connected is herein understood that a solid, liquid or gas can flow from the bottom section into the riser reactor pipe. By the upstream end is herein understood that end of the riser reactor pipe where the solid biomass material or any intermediate oil product or cracked products derived from the solid biomass material enter the riser reactor pipe first.

By a supply of the solid biomass material in the bottom section is herein understood that the solid biomass material is supplied to the riser reactor via the bottom section as opposed to being supplied more downstream via the riser reactor pipe.

When introducing the solid biomass material at the bottom section of the riser reactor, the increased diameter at the bottom advantageously allows one to increase the residence time of the solid biomass material at that part of the riser reactor. In addition, it allows the solid biomass material to take advantage of the high temperature of the catalytic cracking catalyst at that location of the reactor. Further addition of the solid biomass material in the bottom section of the riser reactor may advantageously result in in-situ water formation in that bottom section. The in-situ water formation may lower the hydrocarbon partial pressure and reduce second order hydrogen transfer reactions, thereby resulting in higher olefin yields. Preferably the hydrocarbon partial pressure is lowered to a pressure in the range from 0.3 to 3.3 bar absolute (0.03 to 0.33 MegaPascal); more preferably to a pressure in the range from 0.5 to 2.8 bar absolute (0.05 to 0.28 MegaPascal); still more preferably to a pressure in the range from 0.7 to 2.8 bar absolute (0.07 to 0.28 MegaPascal); and most preferably to a pressure in the range from 1.2 to 2.8 bar absolute (0.12 to 0.28 MegaPascal).

The bottom section having the larger diameter may for example have the form of a lift pot. The bottom section having the larger diameter is therefore also herein referred to as liftpot or enlarged bottom section. The bottom section preferably has a diameter equal to or more than 0.4 meter, more preferably equal to or more than 0.8 meter, and most preferably equal to or more than 1 meter, and the diameter preferably is equal to or less than 5 meters, more preferably equal to or less than 4 meters, most preferably equal to or less than 2 meters. The height of the bottom section preferably lies in the range from equal to or more than 1 meter to equal to or less than 5 meter.

It may be advantageous to also add a lift gas at the bottom section of the riser reactor. Examples of such a liftgas include steam, vaporized oil and/or oil fractions, and mixtures thereof. Steam is most preferred as a lift gas from a practical perspective. However, the use of a vaporized oil and/or oil fraction (preferably vaporized liquefied petroleum gas, gasoline, diesel, kerosene or naphtha) as a liftgas may have the advantage that the liftgas can simultaneously act as a hydrogen donor and may prevent or reduce coke formation. In an especially preferred embodiment both steam as well as vaporized oil and/or a vaporized oil fraction (preferably liquefied petroleum gas, vaporized gasoline, diesel, kerosene or naphtha) are used as a liftgas, optionally the steam and vaporized oil and/or vaporized oil fraction are mixed together in a liftgas mixture. Most preferably the liftgas consists of steam.

The solid biomass material may preferably be mixed with a lift gas or liftgas mixture before entry in the riser reactor. If the solid biomass material is not mixed with a liftgas prior to entry into the riser reactor it may be fed simultaneously with the liftgas (at one and the same location) to the riser reactor, and optionally mixed upon entry of the riser reactor; or it may be fed separately from any liftgas (at different locations) to the riser reactor.

When both the solid biomass material and the liftgas are introduced into the bottom of the riser reactor, the liftgas-to-solid biomass material weight ratio is preferably in the range from equal to or more than 0.01:1, more preferably equal to or more than 0.05:1 to equal to or less than 5:1, more preferably equal to or less than 1.5:1.

The riser reactor pipe preferably has a diameter of equal to or more than 0.3 meter, more preferably equal to or more than 0.6 meter, still more preferably equal to or more than 1 meter and preferably a diameter equal to or less than 3 meter, more preferably equal to or less than 2.5 meter, even more preferably equal to or less than 2 meter and most preferably equal to or less than 1.8 meter.

In the process according to the invention, the riser reactor comprises a riser reactor pipe, which riser reactor pipe has a diameter that increases in a downstream direction. A riser reactor pipe having a diameter that increases in a downstream direction may advantageously allow for increasing gas volumes generated during the conversion of the solid biomass material. The increase of diameter may be intermittent, resulting in two or more sections of the riser reactor pipe having a fixed diameter, wherein each preceding section has a smaller diameter than the subsequent section, when going in a downstream direction; the increase of diameter may be gradual, resulting in a gradual increase of the riser reactor pipe diameter in a downstream direction; or the increase in diameter may be a mixture of gradual and intermittent increases.

In a preferred embodiment the inner diameter at the most narrow part of the riser reactor pipe (i.e. the minimum diameter of the riser reactor pipe, $D_{min-rp}$) lies in the range from equal to or more than 0.3 meter, more preferably from equal to or more than 0.5 meter, still more preferably from equal to or more than 0.6 meter to equal to or less than 2.5 meter, more preferably to equal to or less than 2.25 meter, even more preferably to equal to or less than 2.0 meter and most preferably equal to or less than 1.75 meter.

In a further preferred embodiment the inner diameter at the most broad part of the riser reactor pipe (i.e. the maximum diameter of the riser reactor pipe, $D_{max-rp}$) lies in the range from equal to or more than 0.35 meter, more preferably from equal to or more than 0.60 meter, still more preferably from equal to or more than 1.00 meter to equal to or less than 3.00 meter, more preferably to equal to or less than 2.50 meter, even more preferably to equal to or less than 2.00 meter and most preferably equal to or less than 1.80 meter.

Preferably the ratio of the inner diameter at the most broad part of the riser reactor pipe to the inner diameter at the most narrow part of the riser reactor pipe (i.e. $D_{max-rp}:D_{min-rp}$) is equal to or more than 1.001:1, more preferably equal to or more than 1.01:1 and most preferably equal to or more than 1.10:1; and it is preferably equal to or less than 3.00:1, more preferably equal to or less than 2.00:1, most preferably equal to or less than 1.50:1.

The length of the total riser reactor (including both riser reactor pipe and bottom section) may vary widely. For practical purposes the riser reactor preferably has a length in the range from equal to or more than 10 meters, more preferably equal to or more than 15 meters and most preferably equal to or more than 20 meters, to equal to or less than 65 meters, more preferably equal to or less than 55 meters and most preferably equal to or less than 45 meters.

The bottom section has a diameter that is larger than the diameter of the riser reactor pipe. Where applicable, a diameter is herein understood to refer to the inner diameter, as for example the inner (i.e. the internal) diameter of the bottom section or riser reactor pipe.

Suitably the inner diameter of the most downstream part of the bottom section is larger than the inner diameter of the most upstream part of the riser reactor pipe. That is, at the connection between the bottom section and the riser reactor pipe, the inner diameter of the bottom section is suitably larger than the inner diameter of the riser reactor pipe. Preferably the maximum inner diameter of the bottom section of the riser reactor is larger than the maximum inner diameter of the riser reactor pipe. Preferably the ratio of the maximum inner diameter of the bottom section to the maximum inner diameter of the riser reactor pipe ($D_{max-bs}:D_{max-rp}$) is equal to or more than 1.001:1, more preferably equal to or more than 1.01:1 and most preferably equal to or more than 1.10:1. Further the ratio of the maximum inner diameter of the bottom section to the maximum inner diameter of the riser reactor pipe ($D_{max-bs}:D_{max-rp}$) is preferably equal to or less than 3.00:1, more preferably equal to or less than 2.00:1, most preferably equal to or less than 1.50:1.

Preferably the temperature in the riser reactor ranges from equal to or more than 450° C., more preferably from equal to or more than 480° C., to equal to or less than 800° C., more preferably equal to or less than 750° C.

Preferably the temperature at the location where the solid biomass material is supplied lies in the range from equal to or more than 500° C., more preferably equal to or more than 550° C., and most preferably equal to or more than 600° C., to equal to or less than 800° C., more preferably equal to or less than 750° C.

Preferably the pressure in the riser reactor ranges from equal to or more than 0.5 bar absolute to equal to or less than 10 bar absolute (0.05 MegaPascal-1 MegaPascal), more preferably from equal to or more than 1.0 bar absolute to equal to or less than 6 bar absolute (0.1 MegaPascal to 0.6 MegaPascal).

Preferably the total average residence time of the solid biomass material lies in the range from equal to or more than 1 second, more preferably equal to or more than 1.5 seconds and even more preferably equal to or more than 2 seconds to equal to or less than 10 seconds, preferably equal to or less than 5 seconds and more preferably equal to or less than 4 seconds.

Residence time as referred to in this patent application is based on the vapour residence at outlet conditions, that is, residence time includes not only the residence time of a specified feed (such as the solid biomass material) but also the residence time of its conversion products.

When the solid biomass material has a mean particle size in the range from 100 micrometer to 1000 micron, the total average residence time of the solid biomass material most preferably lies in the range from equal to or more than 1 to equal to or less than 2.5 seconds.

When the solid biomass material has a mean particle size in the range from 30 micrometer to 100 micrometer the total average residence time of the solid biomass material most preferably lies in the range from equal to or more than 0.1 to equal to or less than 1 seconds.

The weight ratio of catalyst to feed (that is the total feed of solid biomass material and any fluid hydrocarbon feed)—herein also referred to as catalyst: feed ratio—preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

The weight ratio of catalyst to solid biomass material (catalyst:solid biomass material ratio) at the location where the solid biomass material is supplied to the riser reactor preferably lies in the range from equal to or more than 1:1, more preferably from equal to or more than 2:1 and most preferably from equal to or more than 3:1 to equal to or less than 150:1, more preferably to equal to or less than 100:1, even more preferably to equal to or less than 50:1, most preferably to equal to or less than 20:1.

In the process according to the invention any fluid hydrocarbon feed, if present, can be introduced to the riser reactor downstream of the solid biomass material. In a preferred embodiment the fluid hydrocarbon feed may be introduced to the catalytic cracking reactor at a location where the solid biomass material already had a residence time in the range from equal to or more than 0.01 seconds, more preferably from equal to or more than 0.05 seconds, and most preferably from equal to or more than 0.1 seconds to equal to or less than 2 seconds, more preferably to equal to or less than 1 seconds, and most preferably to equal to or less than 0.5 seconds.

Preferably the temperature at the location in the riser reactor where the fluid hydrocarbon feed is supplied ranges from equal to or more than 450° C., more preferably from equal to or more than 480° C., to equal to or less than 650° C., more preferably to equal to or less than 600° C. Without wishing to be bound by any kind of theory, it is believed that the addition of the fluid hydrocarbon feed may quench the catalytic cracking catalyst and may therefore lead to a lower temperature at the location where it is added to the riser reactor.

Hence, preferably the solid biomass material is introduced to the riser reactor at a location with temperature T1 and, if present, the fluid hydrocarbon feed is introduced to the riser reactor at a location with temperature T2 and temperature T1 is higher than temperature T2. Preferably both T1 and T2 are equal to or more than 400° C., more preferably equal to or more than 450° C.

The solid biomass material and the fluid hydrocarbon feed can be supplied to the riser reactor in any manner known to the person skilled in the art.

Preferably, however the solid biomass material is supplied to the riser reactor with the help of a screw feeder, especially if the solid biomass material is not supplied as a suspension of solid biomass particles in a hydrocarbon-containing liquid and/or as a mixture with a liftgas. When the solid biomass material is supplied to the riser reactor as a suspension of solid biomass particles in a hydrocarbon-containing liquid, a slurry pump may advantageously be used to supply the solid biomass material to the riser reactor.

The catalytic cracking catalyst can be any catalyst known to the skilled person to be suitable for use in a cracking process. Preferably, the catalytic cracking catalyst comprises a zeolitic component. In addition, the catalytic cracking catalyst can contain an amorphous binder compound and/or a filler. Examples of the amorphous binder component include silica, alumina, titania, zirconia and magnesium oxide, or combinations of two or more of them. Examples of fillers include clays (such as kaolin).

The zeolite is preferably a large pore zeolite. The large pore zeolite includes a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite, preferably synthetic faujasite, for example, zeolite Y or X, ultra-stable zeolite Y (USY), Rare Earth zeolite Y (=REY) and Rare Earth USY (REUSY). According to the present invention USY is preferably used as the large pore zeolite.

The catalytic cracking catalyst can also comprise a medium pore zeolite. The medium pore zeolite that can be used according to the present invention is a zeolite comprising a porous, crystalline aluminosilicate structure having a porous internal cell structure on which the major axis of the pores is in the range of 0.45 nanometer to 0.62 nanometer. Examples of such medium pore zeolites are of the MFI structural type, for example, ZSM-5; the MTW type, for example, ZSM-12; the TON structural type, for example, theta one; and the FER structural type, for example, ferrierite. According to the present invention, ZSM-5 is preferably used as the medium pore zeolite.

According to another embodiment, a blend of large pore and medium pore zeolites may be used. The ratio of the large pore zeolite to the medium pore size zeolite in the cracking catalyst is preferably in the range of 99:1 to 70:30, more preferably in the range of 98:2 to 85:15.

The total amount of the large pore size zeolite and/or medium pore zeolite that is present in the cracking catalyst is preferably in the range of 5 wt % to 40 wt %, more preferably in the range of 10 wt % to 30 wt %, and even more preferably in the range of 10 wt % to 25 wt % relative to the total mass of the catalytic cracking catalyst.

Preferably, the solid biomass material and optionally the fluid hydrocarbon feed flow co-currently in the same direction. The catalytic cracking catalyst can be contacted in a cocurrent-flow, countercurrent-flow or cross-flow configuration with such a flow of the solid biomass material and, if present, fluid hydrocarbon feed. Preferably the catalytic cracking catalyst is contacted in a cocurrent flow configuration with a cocurrent flow of the solid biomass material and, if present, the fluid hydrocarbon feed.

In a preferred embodiment the process according to the invention comprises:

a catalytic cracking step comprising contacting the solid biomass material, and optionally any fluid hydrocarbon feed, with a catalytic cracking catalyst at a temperature of more than 400° C. in a riser reactor to produce one or more cracked products and a spent catalytic cracking catalyst;

a separation step comprising separating the one or more cracked products from the spent catalytic cracking catalyst;

a regeneration step comprising regenerating spent catalytic cracking catalyst to produce a regenerated catalytic cracking catalyst, heat and carbon dioxide; and a recycle step comprising recycling the regenerated catalytic cracking catalyst to the catalytic cracking step.

The catalytic cracking step is preferably carried out as described herein before, where the solid biomass material is contacted with the catalytic cracking catalyst in the riser reactor. In the riser reactor any intermediate oil product and/or cracked products derived from the solid biomass material may be produced.

The separation step is preferably carried out with the help of one or more cyclone separators and/or one or more swirl tubes. Suitable ways of carrying out the separation step are for example described in the Handbook titled "Fluid Catalytic Cracking; Design, Operation, and Troubleshooting of FCC Facilities" by Reza Sadeghbeigi, published by Gulf Publishing Company, Houston Tex. (1995), especially pages 219-223 and the Handbook "Fluid Catalytic Cracking technology and operations", by Joseph W. Wilson, published by PennWell Publishing Company (1997), chapter 3, especially pages 104-120, and chapter 6, especially pages 186 to 194, herein incorporated by reference. The cyclone separators are preferably operated at a velocity in the range from 18 to 80 meters/second, more preferably at a velocity in the range from 25 to 55 meters/second.

In addition the separation step may further comprise a stripping step. In such a stripping step the spent catalyst may be stripped to recover the products absorbed on the spent catalyst before the regeneration step. These products may be recycled and added to the cracked product stream obtained from the catalytic cracking step.

The regeneration step preferably comprises contacting the spent catalytic cracking catalyst with an oxygen containing gas in a regenerator at a temperature of equal to or more than 550° C. to produce a regenerated catalytic cracking catalyst, heat and carbon dioxide. During the regeneration coke, that can be deposited on the catalyst as a result of the catalytic cracking reaction, is burned off to restore the catalyst activity.

The oxygen containing gas may be any oxygen containing gas known to the skilled person to be suitable for use in a regenerator. For example the oxygen containing gas may be air or oxygen-enriched air. By oxygen enriched air is herein understood air comprising more than 21 vol. % oxygen ($O_2$), more preferably air comprising equal to or more than 22 vol. % oxygen, based on the total volume of air.

The heat produced in the exothermic regeneration step is preferably employed to provide energy for the endothermic catalytic cracking step. In addition the heat produced can be used to heat water and/or generate steam. The steam may be used elsewhere in the refinery, for example as a liftgas in the riser reactor.

Preferably the spent catalytic cracking catalyst is regenerated at a temperature in the range from equal to or more than 575° C., more preferably from equal to or more than 600° C., to equal to or less than 950° C., more preferably to equal to or less than 850° C. Preferably the spent catalytic cracking catalyst is regenerated at a pressure in the range from equal to or more than 0.5 bar absolute to equal to or less than 10 bar absolute (0.05 MegaPascal to 1 MegaPascal), more preferably from equal to or more than 1.0 bar absolute to equal to or less than 6 bar absolute (0.1 MegaPascal to 0.6 MegaPascal).

The regenerated catalytic cracking catalyst can be recycled to the catalytic cracking step. In a preferred embodiment a side stream of make-up catalyst is added to the recycle stream to make-up for loss of catalyst in the reaction zone and regenerator.

In the process according to the invention one or more cracked products are produced. In a preferred embodiment this/these one or more cracked products is/are subsequently fractionated to produce one or more product fractions.

As indicated herein, the one or more cracked products may contain one or more oxygen-containing-hydrocarbons. Examples of such oxygen-containing-hydrocarbons include ethers, esters, ketones, acids and alcohols. In specific the one or more cracked products may contain phenols.

Fractionation may be carried out in any manner known to the skilled person in the art to be suitable for fractionation of products from a catalytic cracking unit. For example the fractionation may be carried out as described in the Handbook titled "Fluid Catalytic Cracking technology and operations", by Joseph W. Wilson, published by PennWell Publishing Company (1997), pages 14 to 18, and chapter 8, especially pages 223 to 235, herein incorporated by reference.

The one or more product fractions may contain one or more oxygen-containing-hydrocarbons. Examples of such oxygen-containing-hydrocarbons include ethers, esters, ketones, acids and alcohols. In specific one or more product fractions may contain phenols and/or substituted phenols.

In a further embodiment at least one of the one or more product fractions obtained by fractionation are subsequently hydrodeoxygenated to produce a hydrodeoxygenated product fraction. This/these hydrodeoxygenated product fraction(s) may be used as biofuel and/or biochemical component(s).

By hydrodeoxygenation is herein understood reducing the concentration of oxygen-containing hydrocarbons in one or more product fraction(s) containing oxygen-containing hydrocarbons by contacting the one or more product fraction(s) with hydrogen in the presence of a hydrodeoxygenation catalyst. Oxygen-containing hydrocarbons that can be removed include acids, ethers, esters, ketones, aldehydes, alcohols (such as phenols) and other oxygen-containing compounds.

The hydrodeoxygenation preferably comprises contacting of the one or more product fractions with hydrogen in the presence of an hydrodeoxygenation catalyst at a temperature in the range from equal to or more than 200° C., preferably equal to or more than 250° C., to equal to or less than 450° C., preferably equal to or less than 400° C.; at a total pressure in the range of equal to or more than 10 bar absolute (1 MegaPascal) to equal to or less than 350 bar absolute (35 MegaPascal); and at a partial hydrogen pressure in the range of equal to or more than 2 bar absolute (0.2 MegaPascal) to equal to or less than 350 bar absolute (35 MegaPascal).

The hydrodeoxygenation catalyst can be any type of hydrodeoxygenation catalyst known by the person skilled in the art to be suitable for this purpose.

The hydrodeoxygenation catalyst preferably comprises one or more hydrodeoxygenation metal(s), preferably supported on a catalyst support.

Most preferred are hydrodeoxygenation catalysts comprising Rhodium on alumina ($Rh/Al_2O_3$), Rhodium-Cobalt on alumina ($RhCo/Al_2O_3$), Nickel-Copper on alumina ($NiCu/Al_2O_3$), Nickel-Tungsten on alumina ($NiW/Al_2O_3$), Cobalt-Molybdenum on alumina ($CoMo/Al_2O_3$) or Nickel-Molybdenum on alumina ($NiMo/Al_2O_3$).

If the one or more product fractions also contain one or more sulphur-containing hydrocarbons it may be advantageous to use a sulphided hydrodeoxygenation catalyst. If the hydrodeoxygenation catalyst is sulphided the catalyst may be sulphided in-situ or ex-situ.

In addition to the hydrodeoxygenation, the one or more product fractions may be subjected to hydrodesulphurization, hydrodenitrogenation, hydrocracking and/or hydroisomerization. Such hydrodesulphurization, hydrodenitrogenation, hydrocracking and/or hydroisomerization may be carried out before, after and/or simultaneously with the hydrodeoxygenation.

In a preferred embodiment the one or more product fractions produced in the fractionation; and/or the one or more hydrodeoxygenated product(s) produced in the hydrodeoxygenation can be blended as a biofuel component and/or a biochemical component with one or more other components to produce a biofuel and/or a biochemical. Examples of one or more other components with which the one or more hydrodeoxygenated product(s) may be blended include anti-oxidants, corrosion inhibitors, ashless detergents, dehazers, dyes, lubricity improvers and/or mineral fuel components, but also conventional petroleum derived gasoline, diesel and/or kerosene fractions.

Alternatively the one or more product fractions and/or the one or more hydrodeoxygenated product(s) can be used as an intermediate in the preparation of a biofuel component and/or a biochemical component. In such a case the one or more product fractions and/or the one or more hydrodeoxygenated product(s) may undergo further conversion(s) and the products of this further conversion(s) can subsequently be blended with one or more other components (as listed above) to prepare a biofuel and/or a biochemical.

By a biofuel respectively a biochemical is herein understood a fuel or a chemical that is at least partly derived from a renewable energy source.

In FIG. 1 one embodiment according to the invention is illustrated. In FIG. 1, a feed of solid biomass material (102) and a steam feed (104) are both introduced into the bottom section (106) of an external riser reactor (107). The riser reactor (107) comprises a bottom section (106) connected via its truncated outlet (106a) to a riser reactor pipe (105). The bottom section (106) has a maximum inner diameter ($D_{max-bs}$) that is larger than the maximum inner diameter ($D_{max-rp}$) of the riser reactor pipe (105). The inner diameter of the riser reactor pipe (105) increases in a downstream direction. In the bottom section (106) of the riser reactor (107), the solid biomass material (102) and the steam feed (104) are mixed with hot regenerated catalytic cracking catalyst (108). The mixture of catalytic cracking catalyst (108), solid biomass material (102) and steam feed (104) is forwarded into the riser reactor (107). After about 0.1 seconds of residence time of the solid biomass material (102) in the riser reactor (107), a fluid hydrocarbon feed (110) is introduced into the riser reactor (107). In the reactor riser (107) the solid biomass material (102) and the additional fluid hydrocarbon feed (110) are catalytically cracked to produce one or more cracked products. The mixture of one or more cracked products, catalytic cracking catalyst, steam, and any residual non-cracked solid biomass material and fluid hydrocarbon feed is forwarded via a connection pipe (112) from the top of the riser reactor (107) into a reactor vessel (114), comprising a first cyclone separator (116) closely coupled with a second cyclone separator (118). Cracked products (120) are retrieved via the top of the second cyclone separator (118) and optionally forwarded to a fractionator (not shown). Spent catalytic cracking catalyst (122) is retrieved from the bottom of the cyclone separators (116 and 118) and forwarded to a stripper (124) where further cracked products are stripped off the spent catalytic cracking catalyst (122).

The spent and stripped catalytic cracking catalyst (126) is forwarded to a regenerator (128), where the spent catalytic cracking catalyst is contacted with air (130) to produce a hot regenerated catalytic cracking catalyst (108) that can be recycled to the bottom (106) of the riser reactor (107). The riser reactor may be vertical.

Accordingly, also provided is a riser reactor for biomass conversion comprising:
 a riser reactor pipe, which riser reactor pipe has a diameter that increases from the bottom to the top; and
 a bottom section connected to the riser reactor pipe, which bottom section has a larger diameter than the riser reactor pipe and has at least one inlet;
wherein the ratio of the maximum inner diameter of the bottom section to the maximum inner diameter of the riser reactor pipe is equal to or more than 1.001:1 and equal to or less than 3.00:1.

In one embodiment the bottom section is connected via its truncated outlet to the bottom of the riser reactor pipe. The truncated bottom section has a gradually increasing diameter (see for example 106a). The bottom section may also be a more rectangular bottom shape than truncated.

What is claimed is:

1. A process for converting a solid biomass material comprising contacting the solid biomass material with a catalytic cracking catalyst at a temperature of more than 400° C. in a riser reactor to produce at least one cracked product, wherein the riser reactor comprises:
 a riser reactor pipe, which riser reactor pipe has a diameter that increases in a downstream direction; and
 a bottom section connected to the riser reactor pipe at the upstream end of the bottom section, wherein the bottom section has a larger diameter than a diameter of the riser reactor pipe;
 wherein the solid biomass material is supplied to the riser reactor in the bottom section.

2. The process of claim 1 wherein the ratio of the inner diameter at the most broad part of the riser reactor pipe to the inner diameter at the most narrow part of the riser reactor pipe is equal to or more than 1.001:1 and equal to or less than 3.00:1.

3. The process of claim 1 wherein the ratio of the maximum inner diameter of the bottom section to the maximum inner diameter of the riser reactor pipe is equal to or more than 1.001:1 and equal to or less than 3.00:1.

4. The process of claim 1 wherein the solid biomass material is fed to the riser reactor as a mixture of solid biomass material and a gas.

5. The process of claim 4 wherein the gas is selected from the group consisting of steam, vaporized liquefied petroleum gas, gasoline, diesel, kerosene, naphtha and mixtures thereof.

6. The process of claim 1 wherein the weight ratio of catalyst to solid biomass material at the location where the solid biomass material is supplied to the riser reactor lies in the range from equal to or more than 1:1, to equal to or less than 150:1.

7. The process of claim 1 wherein further a fluid hydrocarbon feed is contacted with the catalytic cracking catalyst in the riser reactor.

8. The process of claim 7 wherein the solid biomass material is supplied to the riser reactor at a location upstream of the location where the fluid hydrocarbon feed is supplied to the riser reactor.

9. The process of claim 7 wherein the fluid hydrocarbon feed comprises straight run (atmospheric) gas oils, flashed distillate, vacuum gas oils (VGO), coker gas oils, gasoline, naphtha, diesel, kerosene, atmospheric residue ("long residue") and vacuum residue ("short residue") and/or mixtures thereof.

10. The process of claim 7 wherein the fluid hydrocarbon feed is introduced to the riser reactor at a location where the solid biomass material already had a residence time in the range from equal to or more than 0.1 seconds to equal to or less than 1 seconds.

11. The process of claim 1, wherein the cracked product is subsequently fractionated to produce at least one product fraction.

12. The process of claim 11 wherein the product fraction produced by fractionation is subsequently hydrodeoxygenated to obtain one or more hydrodeoxygenated products.

13. A process for the preparation of a biofuel and/or a biochemical, wherein the product fraction produced according to the process of claim 11 is blended with at least one other component to prepare a biofuel and/or a biochemical.

14. A process for the preparation of a biofuel and/or a biochemical, wherein the hydrodeoxygenated product produced according to the process of claim 12 is blended with at least one other components to prepare a biofuel and/or a biochemical.

15. The process of claim 1 wherein the bottom section is connected via its truncated outlet to the bottom of the riser reactor pipe.

16. The process of claim 1 further comprising:
 mixing the solid biomass material and the at least one cracked product in the bottom section.

17. A riser reactor for biomass conversion comprising:
 a riser reactor pipe, which riser reactor pipe has a diameter that increases from the bottom to the top; and
 a bottom section connected to the riser reactor pipe, which bottom section has a larger diameter than the riser reactor pipe and has at least one inlet;
 wherein the ratio of the maximum inner diameter of the bottom section to the maximum inner diameter of the riser reactor pipe is equal to or more than 1.001:1 and equal to or less than 3.00:1.

18. The riser reactor of claim 17 wherein the bottom section is connected via its truncated outlet to the bottom of the riser reactor pipe.

* * * * *